United States Patent [19]

Bull et al.

[11] 4,236,227

[45] Nov. 25, 1980

[54] DATA STORAGE SYSTEM

[75] Inventors: Anthony V. Bull, Luton; Richard M. Boardman, Hemel Hempstead, both of England

[73] Assignee: Honeywell Information Systems Inc., Brentford, England

[21] Appl. No.: 91

[22] Filed: Jan. 2, 1979

Related U.S. Application Data

[63] Continuation of Ser. No. 873,562, Jan. 30, 1978, abandoned, which is a continuation of Ser. No. 582,540, May 30, 1975, abandoned.

[51] Int. Cl.³ .................... G11C 15/00; G11C 19/00
[52] U.S. Cl. ...................................... 365/49; 365/77
[58] Field of Search ...................... 365/77, 73, 75, 49

[56] References Cited

U.S. PATENT DOCUMENTS

| 2,770,797 | 11/1956 | Hamilton | 364/200 |
|---|---|---|---|
| 3,107,344 | 10/1963 | Baker | 365/73 |
| 3,153,776 | 10/1964 | Schwartz | 365/77 |
| 3,273,131 | 9/1966 | Strohm | 365/73 |
| 3,414,887 | 12/1968 | Scantlin | 365/73 |
| 3,636,519 | 1/1972 | Heath | 364/200 |
| 3,648,254 | 3/1972 | Beausoleil | 364/200 |
| 3,735,361 | 5/1973 | Tasso | 364/200 |
| 3,748,652 | 7/1973 | Ward | 365/73 |
| 3,755,784 | 8/1973 | Greek | 364/200 |
| 3,919,694 | 11/1975 | Tung | 365/73 |
| 3,940,749 | 2/1976 | Cicognani | 365/77 |

*Primary Examiner*—Stuart N. Hecker
*Attorney, Agent, or Firm*—Finnegan, Henderson, Farabow, Garrett & Dunner

[57] ABSTRACT

A storage system stores information in the form of records each having a key portion and a data portion. These records are stored in key order. The records are stored in a shift register, preferably cyclic, access to the shift register being achieved through one or more ports in it. At each port there is a comparator for comparing a desired key with the keys of the stored records as they pass that port. On a successful comparison, a record may be read, extracted, or written. The system can cope with missing or duplicated keys, and records can be retrieved in sequential key order by simple sequential readout.

11 Claims, 4 Drawing Figures

DATA STORAGE SYSTEM

This is a continuation, of application Ser. No. 873,562, filed Jan. 30, 1978 now abandoned, which is a continuation of Ser. No. 582,540, May 30, 1975, abandoned.

The present invention relates to data storage, and more particularly to storage systems of the self-sequencing or "bookshelf" type.

In a conventional store, there is a large number of locations, each having a different address, and data can be stored in any location by addressing that location. The stored data can be recovered by addressing the location again. With such a system, the information in one location is entirely independent of that in any other.

Frequently, the information is stored in the form of words or records, usually of fixed format, each having a key portion and a data portion, and it is desired to sort these into key order—or, more precisely, to store them so that they can be recovered in key order.

One way of doing this is to use an associative store, in which the records are stored in unknown locations and are recovered by calling for each key in turn. This however is expensive, and there are difficulties involved if the keys are numerically widely separated. Another way of doing this is to use a conventional store with programming means for searching the store, each time a new record is to be stored in it, for the proper place to insert it; either physically moving the already stored records to insert the new one in its right place, or constructing a chain of addresses added onto the records so that each record carries the address of the next. This however is slow, since a large amount of operating time will usually be required for the proper arranging of the records.

Accordingly, there is a need for a store which can quickly and easily receive and make available records in key order, or by key call. The object of the present invention is to provide such a store.

Accordingly, the present invention provides a storage system for storing records each consisting of a key portion and a data portion, comprising a shift register for storing the records and including a port past which the stored records can be shifted so that each in turn is available, the port having an associated comparator which compares the key of the record currently available at the port and a desired key, the comparator output controlling the transfer of a record from the port or into the port, the records stored on one or other side of the port being shifted appropriately if a record is to be inserted into or deleted from the shift register.

The shift register may be bidirectional, but is preferably cyclic and unidirectional. In the latter case, there may be several ports, each with their respective comparators, all fed with the same key and sharing a common input/output channel.

Means are provided for keeping track of how many records are stored in the system, and where those records are.

Three embodiments of the present invention will now be described, by way of example, with reference to the accompanying drawings, in which.

Figure 1:
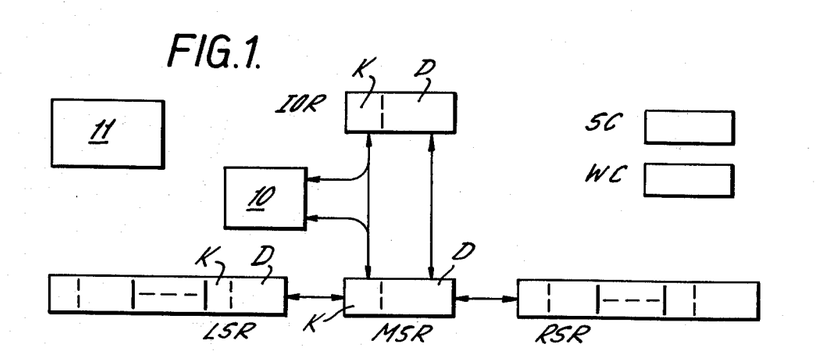
FIG. 1 is a block diagram of a linear storage system.

BASIC PRINCIPLES AND FIG. 1 SYSTEM

The principle of the present invention will be explained with reference to the system shown in FIG. 1. This system comprises a short central shift register MSR, two long shift registers LSR and RSR connected to the left and right respectively of the central shift register (all these registers being bidirectional), an input/output register IOR, a comparator 10, and control circuitry 11. The system operates with words of fixed format consisting of a key portion K and a data portion D. The two registers LSR and RSR can both hold a large number of words, and are of equal length, while registers MSR and IOR can hold a single word each.

The purpose of the system is to store words in the order of their keys. More particularly, in operation the system will store a number of words in key order; if a new word is to be put into the system (a WRITE instruction), the new word is inserted in the proper place in the sequence of words already stored, while if a word is to be read while staying in the system (a READ instruction), or to be read and removed from the system (an EXTRACT instruction), the desired word is located by means of a key, which is used to search until a stored word with that key is found.

The maximum capacity of the system is equal to the number of words which either of the registers LSR and RSR will hold, and in the quiescent state the words are stored in register RSR, at the left-hand end thereof, so that there will be some number of empty word spaces at the right-hand end of register RSR unless the system is full. A word counter WC holds a count of the number of words in the system, and a shift counter SC holds a shift count whose nature and purpose will shortly become apparent.

For a READ instruction, the key of the word to be read is placed in the key portion register IOR. Registers RSR, MSR and LSR are shifted left together, word by word, and as each word in turn occupies register MSR, its key is compared by the comparator 10 with the key in register IOR. Each word shift is counted by the shift counter SC, so that the system has a record of how far the stored words have been shifted. When the comparator detects equal keys, the shifting stops and the data portion of the word now in register MSR—which is the desired word—is copied into the data portion of register IOR. The registers RSR, MSR, and LSR are now shifted right together, word by word, each word shift decrementing the count in the shift counter SC until that count reaches zero, at which point the stored information is back in its original position, and the desired word has already been obtained.

For an EXTRACT instruction, the system operates as for the READ instruction until the comparator indicates that the desired word is in register MSR and its data portion has been transferred to the IOR register. The registers LSR and MSR are then shifted right by one word, while the register RSR is not shifted, and the shift counter SC and word counter WC are each decremented by 1. This results in the extracted word being lost off the right-hand end of register MSR and the words in register LSR closing up with those in register RSR into a continuous sequence. The three registers LSR, MSR, and RSR are then shifted right together, as for READ, to return the stored words to the left-hand end of register RSR.

For a WRITE instruction, the word to be written is placed in the IOR register, and the registers RSR, MSR, and LSR shifted left together until the comparator 10 indicates equal keys or, if no equality is found, until the key in register MSR exceeds the key in register IOR. At this point, the registers LSR and MSR are shifted further left by one word, and the shift counter SC and word counter WC each incremented by 1. This leaves the register MSR empty and the word in register IOR is copied into register MSR. The registers LSR, MSR, and RSR are then all shifted right together under the control of the shift counter SC to bring the stored information back to its normal position at the left-hand end of register RSR.

It follows from the above description that the system stores words with their keys in sequence, the lowest key being on the left.

FURTHER FEATURES

The three instructions of READ, WRITE, and EXTRACT as described above may in fact each consist of several variants in the more developed forms of the system. Thus if, in performing a READ or EXTRACT instruction, the comparator 10 indicates that the key in register MSR is greater than that in register IOR, this means that the system contains no word with the required key. In one variant of these instructions, the system will do nothing further; in another variant, the system will read or extract the word in register MSR, which is the word with the next key above the required one. It will be noted that the system includes a path from the key portion of register MSR to the key portion of register IOR, so that the key of the word in register MSR can be obtained in this instance.

It is also possible for a word to be written into the system to have the same key as a word already in the system. In one variant, the WRITE instruction causes a signal to be generated if the keys in register MSR and IOR are found to be the same; the user may then, for example, wish to combine the stored word with the word about to be stored, or take some further action. In another variant, the WRITE instruction simply stores the new word next to the existing word with the same key.

Since it is possible for the system to contain more than one word with a given key, there are further variants of the READ and EXTRACT instructions, in which on equality of keys being found, the word so found is read or extracted and the registers RSR and MSR are shifted one word to the left to see if the next word has the same key, the sequence continuing until a key inequality is detected. For this variant of READ, the register RSR will, of course, be shifted left with registers LSR and MSR, while for EXTRACT, the register LSR will not be shifted left. A further variant of READ and EXTRACT causes words to be read or extracted in succession regardless of their keys, until some external control ends the operation. This will permit a complete sequence of words to be read out of sequence.

CYCLIC SYSTEM—INTRODUCTION

The FIG. 1 system as so far described suffers from an important drawback, in that the system is only 50% efficient in using its potential storage capacity, since the total stored information must always be capable of being stored in only one of the two shift registers LSR and RSR. This drawback can be overcome by adopting a closed loop form for the shift registers, joining the left-hand end of register LSR to the right-hand end of register RSR, and making the appropriate modifications to the control circuitry 11.

Further, the FIG. 1 system as so far described has the disadvantage that the information stored in it is always shifted back to the register RSR at the end of an instruction, whereas the shift needed for the next instruction will usually be less than this shift. This disadvantage can be overcome fairly easily by arranging for the information to remain where it is after a word has been read, extracted, or written, and, when the next instruction is to be performed, determining from the key of the new word whether any shifting is required and if so in what direction. However, for practical reasons it is desirable to use unidirectional shift registers rather than bidirectional ones. On the adoption of a closed loop form for the shift registers, therefore, it is desirable to retain the feature of the FIG. 1 system that the search is always made by shifting the stored information in the same direction. On completion of a search and reading, writing, or extraction of a word, the stored information will be shifted further in the same direction for the next operation.

It will be apparent from this that the mean access time of the FIG. 1 system is proportional to the quantity of information stored, while that for the closed loop or cyclic system will be constant and equal to that for the FIG. 1 system when full. If the system has a large capacity, the access time will accordingly be long. This can be reduced by splitting the shift register loop into several equal sections, with access points or "ports" between them, so that words can be read from or inserted into any port.

It is also obvious that by providing a shift register of one word width instead of one bit width, i.e. a number of shift registers operating in parallel so that all bits of a word are available together, the speed of the system will be increased correspondingly. The ports will be somewhat more complex, but the main cost of the system lies in the shift registers, and the cost of these will depend on the total quantity of information to be stored and not on whether they are arranged in series, seriesparallel, or parallel.

Figure 2:
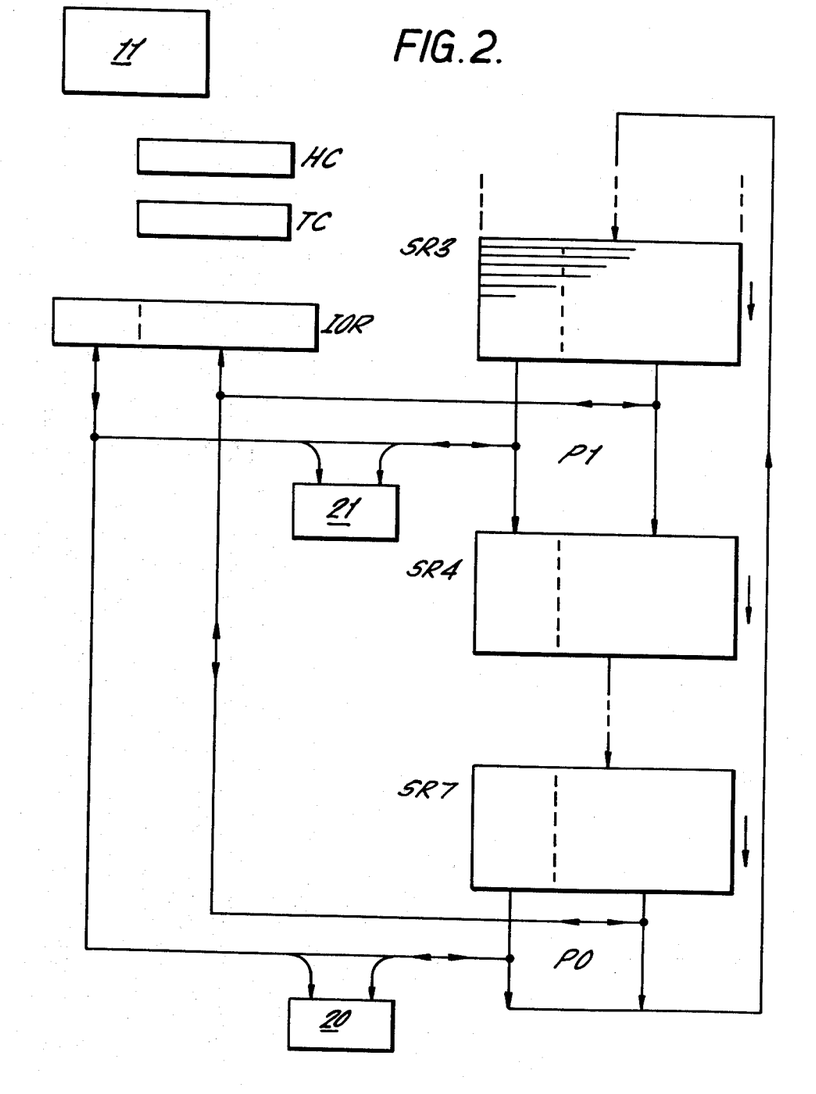
FIG. 2 is a block diagram of a cyclic fixed format system.

FIG. 2 SYSTEM

A system using a closed loop shift register arrangement with several ports and with parallel operation will now be described with reference to FIG. 2. The main part of the system is a set of eight shift registers SR0 to SR7 (only SR3, SR4, and SR7 being shown in the drawing). These are divided into two groups, SR0 to SR3 and SR4 to SR7. Each of these shift registers is a parallel register, i.e. a set of individual shift registers all operating in parallel, so that a full word (data plus key) can be stored in one end and another full word appears at the other end at each shift. The shifting is unidirectional, as indicated in the drawing.

An input/output register IOR is coupled to two ports P0 and P1 between the two groups of shift registers. The key portion of the IOR register feeds two separate comparators 20 and 21, which are also fed with the key portions of the words appearing at the ends of the two blocks of shift registers respectively, and the data portion of register IOR is coupled to the lines carrying the data portions of stored words between the two shift register blocks. The system also includes control circuitry 11 and two counters HC and TC, the head and tail counters. In operation, the system stores information in the form of a single continuous sequence of words somewhere in the sequence of shift registers (the shift register sequence being cyclic), and the HC and TC counters store the addresses of the head and tail of the word sequence.

To discuss the operation of the system, it is convenient to analyze the programmer instructions of READ, WRITE, and EXTRACT into the shift register operations of SEARCH, INSERT, and DELETE. Any instruction is performed by starting with a SEARCH operation until the desired record is found; an INSERT or DELETE operation or a more copying from the shift register to the IOR register may then follow. As in the FIG. 1 system, records pass the ports in ascending key order.

In the system shown in FIG. 2, the SEARCH operation is, in general, performed by shifting the whole of the sequence of stored words. The two comparators 20 and 21 at the ports P0 and P1 each look for a condition which may for convenience be termed a "successful" comparison. More precisely, each comparator is arranged to detect when the key of the currently available record in the stored sequence stops being less than the desired key in register IOR: this may be true equality of the two keys, or it may be a change of key in the stored sequence from less than the desired key direct to greater than the desired key. For the general SEARCH operation, each comparator must detect a key less than the desired key before a "successful" comparison can be achieved; this is to avoid a successful comparison being indicated immediately if the keys in the stored sequence passing a port are much higher than the desired key.

On a successful comparison being made by one or the other of comparators 20 and 21, the corresponding one of ports P0 and P1 is selected. The desired word is then in the last stage of either shift register SR3 or shift register SR7. If a READ instruction is being performed, the data portion of that word is then copied into register IOR, completing the instruction. If a WRITE instruction is being performed, an INSERT operation follows, the head end of the stored word sequence being shifted one word and the new word being written into shift register SR4 or SR0, depending on which port has been selected. If an EXTRACT instruction is being performed, a DELETE operation follows, the data portion of the last read word in shift register SR3 or SR7 is copied into register IOR and the tail end of the stored word sequence is shifted one word to delete that word from the sequence.

Each time a one word shift occurs in a SEARCH operation, both the counters HC and TC are incremented; counter HC is incremented also for an INSERT operation, and counter TC for a DELETE operation. The counts in these two counters are used to disable the comparators 20 and 21 when the stored word sequence does not include the last word position of shift register SR7 and SR3 respectively, so that the comparators only operate when they are looking at the stored word sequence, and not when they are looking at an empty part of the shift register loop.

The counters HC and TC also control the shifting of the shift registers. For a SEARCH operation, all shift registers are shifted together. For the INSERT and DELETE operations, however, one end of the stored word sequence must be shifted while the other end remains stationary. The precise manner in which this is achieved depends on which operation is being performed and which port is selected. The selection of shift registers for shifting for an INSERT operation will be explained in detail; the selection for a DELETE operation is closely similar.

For INSERT, the head of the stored word sequence must be shifted, and it is convenient to shift only those shift registers actually containing part of the head end of the sequence. For this, the signals $x_3$, $x_2$, and $x_1$ from the top three places of the HC counter (signal $x_3$ being the most significant bit) are needed; thus the signals $x_3$ $x_2$ $x_1 = 1\ 1\ 0$ would indicate that the head of the stored word sequence was in shift register SR6 (6—binary 1:0). Signals $P_0$ and $P_1$, from comparators 20 21 and indicating the selection of ports P0 and P1 respectively, are also used. Then the selection signals for the shift registers are given by $SR_7 = x_3 x_2 x_1 + P_1 x_{3'}$ $SR_6 = x_3 x_2 + P_1 x_{3'}$ $SR_5 = x_3(x_2 + x_1) + P_1 x_{3'}$ $SR_4 = x_3 + P_1$ $SR_3 = x_{3'} x_2 x_1 + P_0 x_3$ $SR_2 = x_{3'} x_2 + P_0 x_3$ $SR_1 = x_{3'}(x_2 + x_1) + P_0 x_3$ $SR_0 = x_{3'} + P_0$ These signals are generated by suitable logical circuitry in the control circuitry 11 and are used to gate shift pulses to the shift registers SR7 to SR0 respectively.

A final function is performed by the counters HC and TC. Their difference is continually monitored to keep track of the total number of words stored in the system, to ensure that the system is not overloaded. The maximum number of words which the system can store is 7 times the number of words which any one of the shift registers SR0 to SR7 can store. This is because the head and tail of the stored word sequence must always be in different shift registers, otherwise the INSERT and DELETE operations cannot always be carried out successfully.

As so far described, it has been assumed that the shift registers are "static", e.g. consisting of conventional flip-flops. It may be that they store information in an evanescent rather than permanent form, requiring periodic refresh cycles. These may or may not necessarily involve shifting the information; in either case, the simplest technique is to arrange a "slow clock" to interrupt the functioning of the system at suitable intervals to carry out a refresh cycle, but in the case where the refreshing is achieved by shifting, special refresh cycles are only essential if the information in a part of the system has not been moved for a full refresh period. Thus if a READ or SEARCH operation is followed by another within a refresh cycle, the tail of the stored word sequence will have been refreshed automatically. Internal timers which detect whether the head and tail of the stored word sequence need refreshing can be used to insert special refresh cycles when necessary.

Figure 3:
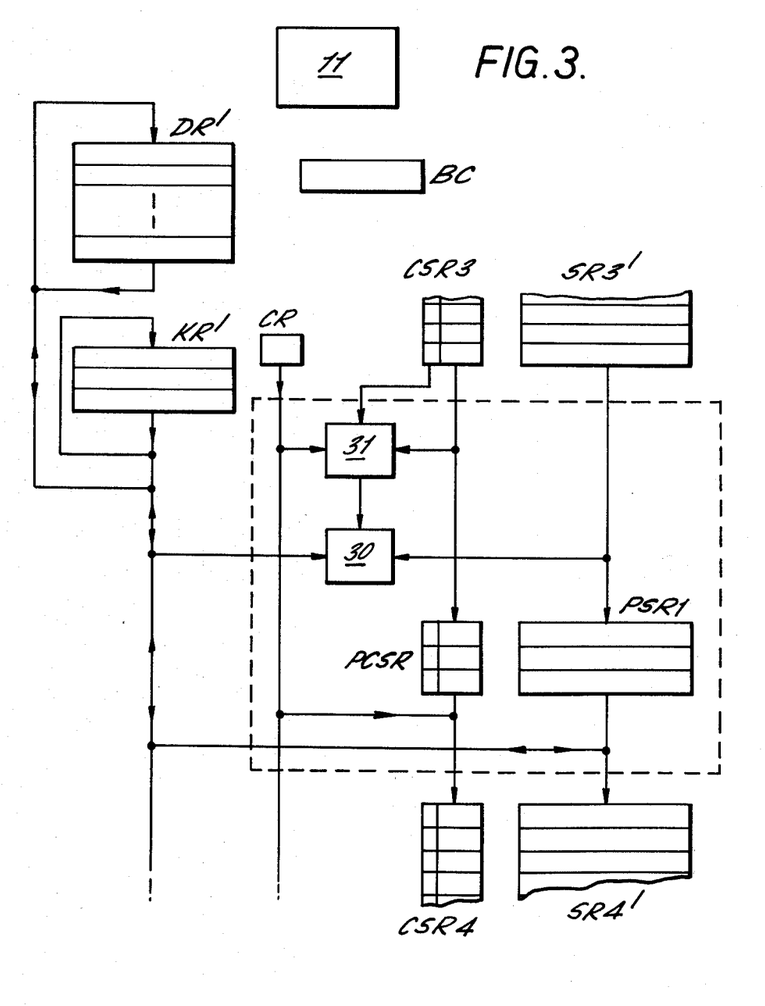
FIG. 3 is a partial block diagram of a cyclic variable format system.
Figure 4:
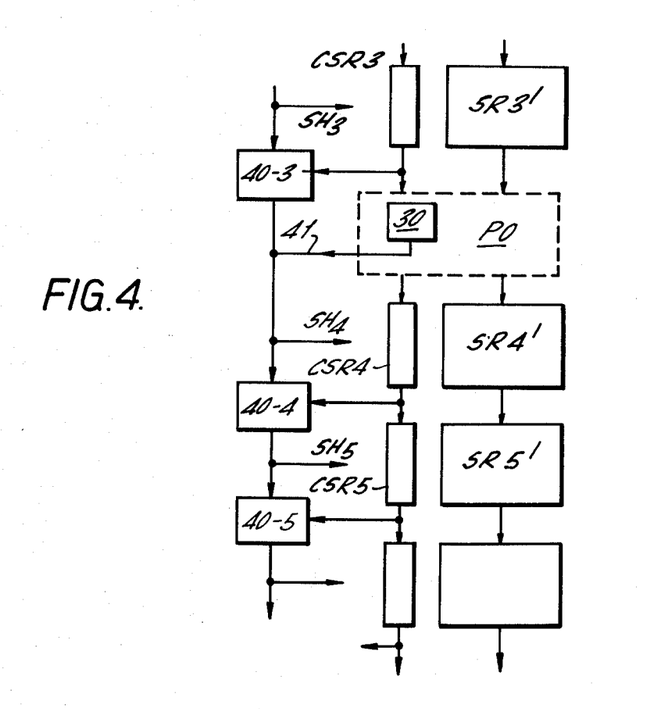
FIG. 4 is a simplified diagram of part of the shift control circuitry of the system of FIG. 3.

VARIABLE FORMAT SYSTEM: FIGS. 3 AND 4

The two systems described so far have both operated with words or records of fixed format. It is possible for records to have a variable format, particularly in that the data portion may be of variable length. A system similar to that of FIG. 2, but with variable length records and certain other differences, will now be described with reference to FIGS. 3 and 4.

FIG. 3 is a general diagram of the system, corresponding generally to FIG. 2, but with only one port P1 shown, the other port or ports being exactly similar to the one shown. The system operates with parallel shift registers, a new byte being stored in one end of a shift register and another byte appearing at its other end at each shift, and it is assumed that records have a key portion of 3 bytes followed by a data portion of a variable number of bytes. The system is also arranged so that several completely different sequences or chains of records can be stored in it; the chains are physically adjacent, with a single empty section of the ring of shift registers existing between the last and first chains.

Referring to FIG. 3, the stored information enters the port area P1 from a shift register SR3' and leaves the port area into another shift register SR4'. In between these two shift registers, there is a port shift register PSR1, 3 bytes long as that is the length of a key. A desired key register KR', also 3 bytes long, is common to all ports, and feeds a comparator 30 for the port P1 shown, the comparator also being fed from shift register SR3'.

Associated with the shift registers are respective control shift registers CSR3, PCSR, and CSR4. Each byte of stored information is accompanied by control information; this consists of one bit, the data/key bit, which is 0 or 1 depending on whether the associated byte is part of data or part of a key, and a chain number which is different for each chain. A chain number of zero has a special significance in that it is used to indicate that the corresponding byte is empty.

In operation, a SEARCH operation will be performed at the first part of whatever instruction is being performed. The data/key bit appearing at the end of the control shift register CSR3 is fed to a second comparator 31, enabling it if the corresponding byte appearing at shift register SR3' is part of a key. When enabled, the comparator 31 compares the chain number appearing from shift register CSR3 with the chain number stored in a chain register CSR3 with the chain number stored in a chain number register CR, set to define the desired chain. On detecting equality, comparator 31 enables comparator 30, which makes a key comparison between the key appearing from shift register SR3' and the desired key in register KR'. This comparison will take three shift periods.

If the comparison is successful, then for a READ or EXTRACT instruction the desired record will be taken byte by byte from between the shift registers PSR1 and SR4'. The data/key bits appearing at the end of register CSR3 are monitored during this process, and when a "1" appears, 3 more byte shifts are performed to obtain the last three bytes of the record being read. This results, of course, in the entire record being obtained, including the key, as may be required if the key in register PSR1 is greater than the key in register KR' or if records are being read out in key sequence.

The next record is thereby left with its key already in register PSR, and the next instruction will not be able to test this key; the remainder of this record will have to be shifted through register PSR1 before a key appears from the register SR3' and can be compared with the new desired key in register KR'. A modification can of course easily be made by providing a feedback loop around the register PSR1, so that the key in it can be recirculated for comparison with the key in register KR'.

If the comparison is successful and a WRITE operation is being performed, then the new word—key and data from registers KR' and DR'—will be inserted into register SR4'. In addition, the chain number will be inserted into the control shift register CSR4', and the data/key bit will be set to 1 for the first three shifts as the key of the new word is written into shift register SR4'.

The system of FIG. 3 uses the information in the control shift registers to determine the proper shifting for the head and tail of the sequence of chains of stored information. The circuitry for this is included in the control circuitry 11. The portions concerned with head shifting are shown in detail in FIG. 4; the portions concerned with tail shifting are similar, and will not be described in detail.

As in the FIG. 2 system, the control circuitry generates shift signals for SEARCH, INSERT, and DELETE: these shift signals are fed to all shift registers for SEARCH, and the purpose of the circuitry shown in FIG. 4 is to select the appropriate shift registers for the shift signals to be fed to for INSERT, for which the head of the stored sequence of records has to be shifted. The signals generated by the circuitry of FIG. 4 are thus selection signals, rather than the shift signals themselves; the selection signals gate the shift signals through to the shift registers for an INSERT operation.

The shift registers containing the stored information are shown as SR3', SR4', SR5', etc., and their associated control shift registers as CSR3, CSR4, CSR5, etc. Each of these shift registers operates as a unit, in that all information in it shifts forward by one byte on receiving a shift pulse. The control shift registers are shifted in synchronism with their associated data shift registers.

The comparator 30 in port area P1 produces a signal on line 41 on a successful comparison. This signal is fed to a cyclic chain of gating circuits 40-3, 40-4, 40-5, etc. as shown. If a successful comparison has occurred at port PO, registers SR4' and CSR4 will always be shifted for a head shift (INSERT operation), and hence the selection signal SH4 for them is generated directly from line 41. The next shift registers SR5' and CSR5 have to be shifted if and only if the output end of register SR4' is not empty. This is detected by the gating circuit 40-4, which permits the signal from line 41 to pass through it if the chain number appearing at the end of register CSR4 is not zero. A shift signal $SH_5$ to the registers SR5' and CSR5 will thus be generated if information is about to be fed to them. The chain of gating circuits 40-3, 40-4, 40-5, etc. similarly generates shift signals for as far around the loop of shift registers as is required, past the other port PO if necessary.

The word counter of the FIG. 2 system will, of course, be replaced by a byte counter BC in the system of FIG. 3 and 4 to prevent overfilling of the system. Alternatively, overfilling may be detected by determining whether at least two shift registers have empty bytes at their ends, i.e. whether they have chain numbers of zero at their ends. If only one shift register has a chain number of zero at its end, the system is full. This technique will result in, on average, 1 ½ shift registers being empty when the system appears full.

If a large number of chains can be accommodated in the system, e.g. 64 chains, the control shift registers will have to be 7 bits wide, to contain the data/key bit and the 6-bit chain number. Since the chain number is only required for the first byte of each record, this means that there is considerable redundancy in the control shift registers. This can be reduced in two ways.

First, the control shift registers can be reduced to 2 bits width, with the chain numbers being stored in the main shift registers, adding a 1-byte chain number onto the front of each record. The control shift register contents would then indicate, for each byte, four possibilities: empty, data, chain number, or key. A chain number indication would cause the corresponding byte to be compared with the chain number in the chain number register, while the other indications would be treated as in the FIG. 3 system.

Second, instead of using control shift registers, a set of counters could be used, consisting of a head counter, a tail counter, and a further counter for each interchain point—i.e. a total of one more counter than the number of chains. These interchain point counters would be incremented in the same way as the head and tail counters, and would also be used to select the appropriate ports during a SEARCH operation when the required chain ws passing those ports. In a sense, the empty portion of the system can be regarded as an extra "dummy" chain, treated to some extent like all the other chains but inaccessible as far as data reading and writing is concerned, stretching and shrinking as data is read from or written into other chains.

Having described the invention, what is claimed as new and novel is:

1. A self-sequencing storage system having shift registers for storing in a data file information records comprising key data and record data in a predetermined sequence based upon the key data in said information records and including a control circuit for controlling the access of records in said data file, the deletion of records from said data file, the shifting of said shift registers storing said data file, and the counting of records in said data file, said storage system comprising:
   first shift register means for storing said information records;
   second shift register means for storing said information records;
   data port register means coupled to said first shift register means and said second shift register means, said first shift register means, said second shift register means and said data port register means controlled by said control circuit for shifting of information records between said first shift register means and said second shift register means, through said data port register means, said data port register means including a key data storage location and a record data storage location;
   input/output register means for storing an information record, said input/output register means being coupled to said data port register means for the bidirectional transfer of key data and record data therebetween; and
   key data comparator means coupled to said data port means and said input/output register means for comparing the key data of said information records shifted between said first shift register means and said second shift register means through said data port register means with key data in said information record stored in said input/output register and for gating an information record between said data port register means and said input/output register means during said addition of information records to said data file, said deletion of information records from said data file, and said access of information records in said data file to maintain said sequential order of said information records shifted between said first shift register means and said second shift register means through said data port register means.

2. The self-sequencing information storage system according to claim 1 further including a word counter controlled by said control circuit for counting the number of information records stored in said data file.

3. A closed-loop, self-sequencing information storage system having shift registers for storing in a data file information records comprising key data and record data in a predetermined sequence based upon the key data in said information records, and including a control circuit for controlling the access of records in said data file, the insertion of records into said data file, the deletion of records from said data file, the shifting of shift registers storing said data file, and the counting of records in said data file, said storage system comprising:
   first shift register means for storing a plurality of information records, said first shift register means having a first storage location and a last storage location;
   second shift register means for storing a plurality of information records, said second shift register means having a first storage location and a last storage location, said first shift register means and said second shift register means together storing said data file as a continuous series of information records in said sequential order based upon said key data in said information records;
   first data transfer means for transferring information records from said first storage location of said second shift register means to said last storage location of said first shift register means;
   second data transfer means for transferring information records from the first storge location of said first shift register means to said last storage location of said second shift register means, said information records being shifted from said second shift register means through said first data transfer means to said first shift register means and from said first shift register means through said second data transfer means to said second shift register means under the control of said control circuit;
   input/output register means for storing information records;
   first data port means coupling said input/output register means to said first data transfer means for the bidirectional transfer of information records therebetween;
   second data port means coupling said input/output register means to said second data transfer means for the bidirectional transfer of information records therebetween;
   first key comparator means for comparing key data in said input/output register means with key data in said first storage location of said second shift register means;
   second key comparator means for comparing key data in said input/output register means with said key data in said first storage location of said first shift register means, said first key comparator means and said second key comparator means together gating the bidirectional transfer of information records between said input/output register means and first data transfer means and said input/output register means and said second data transfer means, respectively, as said information records are shifted between said first shift register means and said second shift register means under the control of said control circuit to maintain said sequence of said data file stored in said first shift register means and said second shift register means when information records are added to said data file, deleted from said data file and accessed in said data file.

4. The closed-loop, self-sequencing information storage system according to claim 3 wherein said first shift register means comprises a plurality of parallel shift registers.

5. The closed-loop, self-sequencing information storage system of claim 3 wherein said second shift register means comprises a plurality of parallel shift registers.

6. The closed-loop, self-sequencing information storage system of either claim 4 or 5 wherein said shift registers in said plurality of parallel shift registers are unidirectional.

7. The closed-loop, self-sequencing information storage system of claim 3 further including a head counter controlled by said control circuit for storing the location in said first shift register means or said second shift register means where the first information record in said data file is stored.

8. The closed-loop, self-sequencing information storage system of claim 3 urther including a tail counter controlled by said control circuit for storing the location in said first shift register means or said second shift register means where the last information record in said data file is stored.

9. A self-sequencing information storage system having shift registers for storing a data file including variable length information records comprising key data and record data in a predetermined sequence based upon key data in said information records and for storing a control file associated with said data file and including a control circuit for controlling the access of records in said data file, the insertion of records into said data file, the deletion of records from said data file, the shifting of shift registers storing said data file and said control file, and the counting of bytes of information stored in said data file, said storage system comprising:

record data register means for storing record data in a series of storage positions;

key data register means for storing key data in a series of storage positions;

first shift register means for storing key data and record data in a series of storage positions;

first control shift register means for storing control data in a series of storage positions, said storage positions in said first control shift register being in a one-to-one association with said storage positions in said first shift register means, each storage position in said first control shift register means storing an indicator for indicating whether its associated storage position in said first shift register means contains key data or record data;

data port means including a port shift register and a port control shift register;

first transfer means for transferring said key data and said record data from said first shift register means to said port shift register;

second transfer means for transferring control data from said first control shift register to said port control shift register;

second shift register means for storing key data and record data in a series of storage positions, said first shift register means and said second shift register means together storing said data file;

third transfer means for transferring key data and record data from said port shift register to said second shift register means;

second control shift register means for storing control data in a series of storage position, said storage positions in said second control shift register means being in a one-to-one association with said storage positions in said second shift register means, each storage position in said second control shift register means storing an indicator for indicating whether its associated storage position in said second shift register means contains key data or record data, said first control shift register means and said second control shift register means together storing said control file;

fourth transfer means for transferring control data from said port control shift register to said second control shift register means, said information records being shifted from said first shift register means to said port shift register through said first transfer means and from said port shift register to said second shift register means through said third transfer means under the control of said control circuit and said control data being shifted from said first control shift register means to said port control shift register through said second transfer means and from said port control shift register to said second control shift register means through said fourth transfer means under the control of said control circuit;

fifth transfer means coupling said record data register means and said key data register means to said third transfer means for the bidirectional transfer of key data and record data therebetween;

first comparator means in said data port means, said first comparator means being coupled to said first control shift register means for also receiving said control data transferred from said first control shift register means to said port control shift register and for determining from said received control data whether said data transferred to said port shift register from said first shift register means is key data or record data; and second comparator means coupled to said record data register means, said key data register means, said first comparator means, and said first transfer means and responsive to a said determination by said first comparator means that key data is being transferred from said first shift register means to said port shift register for comparing said transferred key data to key data stored in said key data register means and for gating the transfer of key data and record data between said third transfer means and said key data register means and said record data register means, respectively, during said shifting of said information records from said port shift register to said second shift register means to maintain said sequential order to key data and record data in said data file as information records are accessed in said data file, added to said data file, or deleted from said data file.

10. A self-sequencing information storage system according to claim 9 wherein said information records in said data file are stored in sequence positions and wherein said storage positions in said first control shift register means each contain a sequence indicator for indicating the sequence positions in said data file of said data stored in said storage positions of said first shift register means associated with said storage positions in said first control shift register means.

11. The self-sequencing information storage system according to claim 10 wherein each of said information records in said data file comprise a plurality of bytes and said system further includes a byte counter controlled by said control circuit for counting the number of bytes in said data file.

* * * * *